(12) United States Patent
Ronnow et al.

(10) Patent No.: US 12,002,045 B2
(45) Date of Patent: Jun. 4, 2024

(54) RESOURCE MANAGEMENT SYSTEM AND METHOD OF OPERATION THEREOF

(71) Applicant: UVUE LTD, Bury St Edmunds (GB)

(72) Inventors: Troels Ronnow, Cambridge (GB); Jonathan Ward, Cambridge (GB); Toby William Simpson, Cambridge (GB)

(*) Notice: Subject to any disclaimer, the term of this patent is extended or adjusted under 35 U.S.C. 154(b) by 862 days.

(21) Appl. No.: 16/978,844

(22) PCT Filed: Mar. 8, 2019

(86) PCT No.: PCT/EP2019/055850
§ 371 (c)(1),
(2) Date: Sep. 8, 2020

(87) PCT Pub. No.: WO2019/170861
PCT Pub. Date: Sep. 12, 2019

(65) Prior Publication Data
US 2020/0410491 A1    Dec. 31, 2020

(30) Foreign Application Priority Data

Mar. 8, 2018  (GB) ..................................... 1803739
Mar. 26, 2018 (GB) ..................................... 1804834

(51) Int. Cl.
*G06Q 20/40*    (2012.01)
*G06F 16/23*    (2019.01)
(Continued)

(52) U.S. Cl.
CPC ....... *G06Q 20/401* (2013.01); *G06F 16/2379* (2019.01); *G06Q 20/382* (2013.01);
(Continued)

(58) Field of Classification Search
CPC ............... G06Q 20/401; G06Q 20/382; G06Q 2220/00; G06F 16/2379; H04L 9/3218;
(Continued)

(56) References Cited

U.S. PATENT DOCUMENTS

2017/0132625 A1    5/2017  Kennedy
2017/0243212 A1    8/2017  Castinado et al.
(Continued)

FOREIGN PATENT DOCUMENTS

CN    107766540 A    3/2018
KR    20180014534 A   2/2018
(Continued)

OTHER PUBLICATIONS

Bitcoin Wiki, "Full Node", revised Feb. 14, 2018 [online], 5 pages. available from "https ://en. bitcoin.it/w/index. php ?title=Full node &oldid=64978".
(Continued)

*Primary Examiner* — Robert W Beausoliel, Jr.
*Assistant Examiner* — Mohammad S Bhuyan
(74) *Attorney, Agent, or Firm* — RC Trademark Company

(57) ABSTRACT

Disclosed is a resource management system that maintains records relating to transactions associated with resources, wherein the system is implemented as a distributed ledger arrangement including data processing nodes that are coupled via a data communication network. The records are maintained in corresponding chains, wherein each chain includes a temporally defined sequence of verified entries and each entry defines corresponding transactions. When new entry is to be made to a given chain, information concerning the new entry is communicated to the data processing nodes for verification thereof. The system records the new entry when verified, to its corresponding given chain. The system includes a filter arrangement for
(Continued)

limiting communication regarding the new entry to be made only to a subset of the data processing nodes of the system for verifying the new entry.

9 Claims, 4 Drawing Sheets

(51) Int. Cl.
    *G06Q 20/38*     (2012.01)
    *H04L 9/00*     (2022.01)
    *H04L 9/32*     (2006.01)
    *H04L 9/40*     (2022.01)

(52) U.S. Cl.
    CPC ....... *H04L 9/3218* (2013.01); *G06Q 2220/00* (2013.01); *H04L 9/50* (2022.05); *H04L 2209/56* (2013.01)

(58) Field of Classification Search
    CPC ..... H04L 9/50; H04L 2209/56; H04L 9/3239; H04L 63/1441
    See application file for complete search history.

(56) References Cited

U.S. PATENT DOCUMENTS

| | | |
|---|---|---|
| 2017/0344987 A1 | 11/2017 | Davis |
| 2018/0121909 A1* | 5/2018 | Christidis ............ G06Q 20/383 |
| 2018/0225660 A1* | 8/2018 | Chapman ............. G06Q 20/389 |
| 2020/0104809 A1* | 4/2020 | Destefanis ............. G06Q 10/06 |
| 2021/0194690 A1* | 6/2021 | Fletcher ................ H04L 9/3218 |

FOREIGN PATENT DOCUMENTS

| | | |
|---|---|---|
| WO | 2017021154 A1 | 2/2017 |
| WO | 2017182601 A1 | 10/2017 |

OTHER PUBLICATIONS

Combined Search and Examination Report under Sections 17 and 18(3) issued in GB Application No. GB1803739.0 dated Sep. 11, 2018, 09 pages.

Notification of Transmittal of the International Search Report and Written Opinion of the International Searching Authority mailed in PCT Application No. PCT/EP2019/055850 dated Jul. 12, 2019, 12 pages.

Written Opinion of the International Preliminary Examining Authority mailed in PCT Application No. PCT/ EP2019/055850 dated Feb. 11, 2020, 08 pages.

International Preliminary Report on Patentability mailed in PCT Application No. PCT/EP2019/055850 dated May 4, 2020, 09 pages.

\* cited by examiner

RESOURCE MANAGEMENT SYSTEM AND METHOD OF OPERATION THEREOF

TECHNICAL FIELD

The present disclosure relates generally to systems for managing information related to exchange of resources; and more specifically to methods and systems for secure transactions and management of resources and records related thereto. Furthermore, the present disclosure relates to systems and methods for data processing using tokens. Moreover, the present disclosure also relates to computer program products comprising a non-transitory computer-readable storage medium having computer-readable instructions stored thereon, the computer-readable instructions being executable by a computerized device comprising

BACKGROUND

Recently, the activity in the field of digital transactions has increased exponentially, for example, digital transactions related to blockchain systems (for example, Granted European Patent No. 325719161). Additionally, a rush in digital transactions has increased a need for recordal of the transactions. Moreover, the transactions associated with resources needs to be validated for recordal thereof. Furthermore, such digital transactions are facilitated by tokens (namely, cryptocurrencies). Subsequently, such transactions involving tokens are, for example, executed within a system that is configured to perform authentication and verification of the tokens, using for example, security mechanisms such as encryption of data.

Typically, systems employing distributed ledgers are utilised for validation and recordal of such transactions on a de-centralised network.

Specifically, the distributed ledger maintains record associated with the transactions at each processing node connected to de-centralised network thereof. Additionally, a record stored on the distributed ledger includes information associated with at least one transaction and transacting parties thereof. Moreover, each of processing nodes connected to the de-centralised network of the distributed ledger participate in validation of the record. Such validation establishes authentication for the associated record. However, the existing distributed ledgers for managing records of transactions face several drawbacks associated with functioning and performance thereof.

Additionally, at an instance, the existing systems require updating records with each of the processing nodes in the de-centralised network that involves colossal processing and time complexity. Moreover, in many cases such updating of records with each of the processing nodes may not be necessary. Furthermore, validation of the records of transactions require large amount of processing power and time. Additionally, validation of the records may cause validation conflicts because of outdated or fallacious information stored on the de-centralised network. Moreover, the existing systems for managing the records are time intensive. Furthermore, the existing systems are unable to accommodate an unexpected increase in a number of records. Subsequently, the existing systems fail to operate optimally for recordal of increased number of records therein. Moreover, the system also faces difficulty in recordal of a plurality of records in parallel as it lacks scalability and simultaneous requirement of validating and updating the associated records.

Furthermore, existing systems facilitates transaction of tokens involving temporally frequent, namely "high velocity", exchange of tokens between two or more transacting parties. Consequently, tokens often need to be directly bound with a value of a fiat currency in order to maintain uniformity in exchange of the tokens. However, such temporally frequent exchange of tokens significantly reduces chances of an increase in value of tokens over a given period of time.

Alternatively, the existing systems facilitates temporally infrequent, namely "low velocity", exchange of tokens between two or more entities. Such temporally infrequency transactions usually occur when a value of the tokens changes based upon a value of resources associated thereto. Such tokens may be held by the transacting entities for an extensive period of time with expectations of making a profit crediting to an increase in value of the tokens. However, such temporally infrequent transactions of the tokens may impair utility thereof to be used, for example, as a medium of exchange. Furthermore, it may also lead to stagnation of the system and financial network using such tokens for executing transactions. Consequently, transacting parties having the tokens may suffer as it becomes difficult for optimal use thereof. Consequently, the existing systems are unreliable and non-scalable for executing data processing associated with tokens therein. Such unreliability and non-scalability is especially relevant for peer-to-peer communication networks, such that a solution to a technical problem of scalability of distributed peer-to-peer networks for performing data processing is an issue that the present disclosure seeks to address.

Therefore, in light of the foregoing discussion, there exists a need to overcome the aforementioned drawbacks associated with conventional systems that manages recordal of transactions and a lack of reliability and scalability of systems for performing data processing using tokens.

SUMMARY

The present disclosure seeks to provide a resource management system that is configured to maintain one or more records relating to one or more transactions associated with one or more resources.

The present disclosure also seeks to provide a method of operating a resource management system that is configured to maintain one or more records relating to one or more transactions associated with one or more resources.

In one aspect, an embodiment of the present disclosure provides a resource management system that is configured to maintain one or more records relating to one or more transactions associated with one or more resources, wherein the resource management system is implemented as a distributed ledger arrangement including one or more data processing nodes that are mutually coupled via a data communication network, characterised in that:

(i) the one or more records are maintained in one or more corresponding chains, wherein each chain includes a temporally defined sequence of verified entries, wherein each entry defines one or more corresponding transactions relating to one or more corresponding resources;

(ii) when at least one new entry is to be made to a given chain, information concerning the at least one new entry is communicated to the one or more data processing nodes of the resource management system for verifying whether or not the at least one new entry is valid for recording to the given chain;

(iii) the resource management system records the at least one new entry when verified to its corresponding given chain; and (iv) the resource management system includes a filter arrangement for limiting communication regarding the at least one new entry to be made only to a subset of the one or more data processing nodes of the resource management system for verifying the at least one new entry to reduce an amount of computing effort and data communication occurring within the resource management system required for processing the at least one new entry.

The present disclosure seeks to provide a solution to the existing problem of requirement of high processing and time complexity for performing one or more transactions and validating one or more records related thereto. Furthermore, the present disclosure also seeks to provide a solution to resolve conflicting validations of information associated with the one or more transactions.

Optionally, a data processing arrangement is configured to process tokens that are transacted via the data communication network, characterised in that:

(i) at least a first portion of the tokens are Persistent Tokens that are representative of one or more values of one or more resources, wherein the Persistent Tokens are transacted within the system, and at least a second portion of the tokens are Transient Tokens that represent one or more data processing resources of the data processing arrangement used for processing one or more transactions of the Persistent Tokens, wherein the Transient Tokens have a defined lifetime after creation thereof within the system; and (ii) the data processing arrangement transacts or executes the Persistent Tokens as supported by consuming Transient Tokens accompanying the Persistent Tokens;

wherein the Transient Tokens are representative of at least one of: computer central processing unit (CPU) cycles executable within the system, energy dissipation within the system, access time taken by data processing resources of the system during execution of transactions of Persistent Tokens, access to data memory of the system for storing and/or retrieving data.

Optionally, the filter arrangement is configured to preselect the subset of the one or more data processing nodes depending upon at least one of:

(i) information relating to a plurality of earlier entries recorded in the given chain to which the at least new entry to be verified is to be recorded;

(ii) a group of resources that are mutually related for which the at least one new entry to be verified;

(iii) a group of transactions that are mutually related for which the at least one new entry to be validated;

(iv) information relating to parties associated with one or more transactions associated with the at least one new entry to be verified;

(v) a group of chains that are mutually related, and that are related to the at least one new entry to be verified;

(vi) a manner in which one or more chains have been previously split into one or more daughter chains onto which the at least one new entry is to be recorded;

(vii) information relating to proof-of-work, proof-of-stake, election of the at least new entry to be verified relating to one or more resources associated with the at least one new entry to be verified;

(viii) management of responsibility across the one or more data processing nodes when data is distributed across one or more chains associated with the at least one new entry to be verified; and (ix) a grouping of resources that are frequently traded with one and another.

Optionally, the resource management system includes a resolution arrangement for resolving conflicting validations for the at least one new entry to be recorded against one or more chains.

Optionally, the resolution arrangement is controlled based upon a consensus from a plurality of proofs provided in response to the conflicting validation arising within the resource management system.

Optionally, the at least one new entry concerns a plurality of new entries to be recorded simultaneously, wherein the resource management system is operable to process the plurality of new entries in parallel.

Optionally, representative quantity of CPU cycles executable within the system include a measure of at least one of: access to data storage, memory, access to data communication system bandwidth, data communication channels or ports, data processor energy use, data processor energy dissipation, access time taken by data processing resources during transactions, heat generation, cooling energy applied or any other measure associated with one or more CPU cycles.

Optionally, the system is configured to use Transient Tokens generated by executing smart contracts within the system.

Optionally, the system is configured to use Transient Tokens generated by data mining activities.

Optionally, the system is configured to use Transient Tokens generated by execution of smart contracts.

Optionally, the smart contracts include a first address field containing a first address of the Transient Tokens accompanying the Persistent Tokens, a second address field containing a second address, wherein the second address associates with an address to which unused Transient Tokens related to the first address are to be transferred and a signature field that verifies the transaction.

Optionally, the verification is performed by providing at least one of: replication, proof of work, proof of stake.

Optionally, the value of the Transient Tokens depreciates according to at least one depreciation rate.

Optionally, the Transient Tokens are added to a pool of tokens after expiring the defined lifetime thereof.

Optionally, the number of Transient Tokens available for transaction within the system are associated with the number of Transient Tokens in the pool of tokens.

In another aspect, an embodiment of the present disclosure provides a method of operating a resource management system that is configured to maintain one or more records relating to one or more transactions associated with one or more resources, wherein the resource management system is implemented as a distributed ledger arrangement including one or more data processing nodes that are mutually coupled via a data communication network, characterised in that the method includes:

(i) maintaining the one or more records in one or more corresponding chains, wherein each chain includes a temporally defined sequence of verified entries, wherein each entry defines one or more corresponding transactions relating to one or more corresponding resources;

(ii) when at least one new entry is to be made to a given chain, communicating information concerning the at least one new entry to the one or more data processing nodes of the resource management system for verifying whether or not the at least one new entry is valid for recording to the given chain;

(iii) using the resource management system to record the at least one new entry when verified to its corresponding given chain; and (iv) using a filter arrangement of the resource management system includes for limiting communication regarding the at least one new entry to be made only to a subset of the one or more data processing nodes of the resource management system for verifying the at least one new entry to reduce an amount of computing effort and data communication occurring within the resource management system required for processing the at least one new entry.

Optionally, the method includes configuring a data processing arrangement to process tokens that are transacted vis the data communication network, characterised in that the method includes:

(i) arranging for at least a first portion of the tokens to be Persistent Tokens that are representative of one or more values of one or more resources, wherein the Persistent Tokens are transacted within the system, and at least a second portion of the tokens are Transient Tokens that represent one or more data processing resources of the data processing arrangement used for processing one or more transactions of the Persistent Tokens, wherein the Transient Tokens have a defined lifetime after creation thereof within the system; and (ii) transacting or executing using the data processing arrangement the Persistent Tokens as supported by consuming Transient Tokens accompanying the Persistent Tokens;

wherein the Transient Tokens are representative of at least one of: CPU cycles executable within the system, energy dissipation within the system, access time taken by data processing resources of the system during execution of transactions of Persistent Tokens, access to data memory of the system for storing and/or retrieving data.

Optionally, the method includes configuring the filter arrangement to pre-select the subset of the one or more data processing nodes depending upon at least one of:
  (i) information relating to a plurality of earlier entries recorded in the given chain to which the at least new entry to be verified is to be recorded;
  (ii) a group of resources that are mutually related for which the at least one new entry to be verified;
  (iii) a group of transactions that are mutually related for which the at least one new entry to be verified;
  (iv) information relating to parties associated with one or more transactions associated with the at least one new entry to be verified;
  (v) a group of chains that are mutually related, and that are related to the at least one new entry to be verified;
  (vi) a manner in which one or more chains have been previously split into one or more daughter chains onto which the at least one new entry is to be recorded;
  (vii) information relating to proof-of-work, proof-of-stake, election of the at least new entry to be verified relating to one or more resources associated with the at least one new entry to be verified;
  (viii) management of responsibility across the one or more data processing nodes when data is distributed across one or more chains associated with the at least one new entry to be verified; and
  (ix) a grouping of resources that are frequently traded with one and another.

Optionally, the method includes using a resolution arrangement of the resource management system for resolving conflicting validations for the at least one new entry to be recorded against one or more chains.

Optionally, the method includes controlling the resolution arrangement based upon a consensus from a plurality of proofs provided in response to a conflicting validation arising within the resource management system.

Optionally, the method includes using the resource management system to process the at least one new entry when concerning a plurality of new entries to be recorded simultaneously, wherein the resource management system is operable to process the plurality of new entries in parallel.

Optionally, representative quantity of CPU cycles include a measure of at least one of: access to data storage, memory, access to data communication system bandwidth, data communication channels or ports, data processor energy use, data processor energy dissipation, access time taken by data processing resources during transactions, heat generation, cooling energy applied or any other measure associated with one or more CPU cycles.

Optionally, the method includes using Transient Tokens generated by executing smart contracts within the system.

Optionally, the method includes using Transient Tokens generated by data mining activities.

Optionally, the method includes using Transient Tokens generated by execution of smart contracts.

Optionally, the smart contracts include one address field containing a first address of the Transient Tokens accompanying the Persistent Tokens, another address field containing a second address, wherein the second address associates with an address to which unused Transient Tokens related to the first address are to be transferred and a signature field that verifies the transaction.

Optionally, the verification is performed by providing at least one of: replication, proof of work, proof of stake.

Optionally, the method includes depreciating the value of the Transient Tokens according to at least one depreciation rate.

Optionally, the method includes adding the Transient Tokens to a pool of tokens after expiring the defined lifetime thereof.

Optionally, the method includes associating the number of Transient Tokens available for transaction with the number of Transient Tokens in the pool of tokens.

In yet another aspect, an embodiment of the present disclosure provides a computer program product comprising a non-transitory computer-readable storage medium having computer-readable instructions stored thereon, the computer-readable instructions being executable by a computerized device comprising data processing hardware to execute a method of operating a resource management system.

The present disclosure provides a resource management system and a method of operating the resource management system. The described system provides an optimal way of recording transactions relating to one or more resources. Specifically, the optimal recordal of the transactions to the distributed ledger facilitate unambiguous and secure recordal thereof. Moreover, the present disclosure enables time-efficient validation of the transactions by strategically selecting a number of data processing nodes that should validate the transactions thereby limiting the number of data processing nodes participating in the process of validation of the transactions. Consequently, the described system substantially reduces the processing power required for validation of a single transaction for recordal thereof.

Additionally, the system disclosed herein is scalable and allows accommodation of increased number transactions at a given time. Furthermore, the present disclosure substantially reduces malicious transactions and double-spending of resources. Moreover, the described method is computationally simple and easy to implement and requires less processing capability to be implemented.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
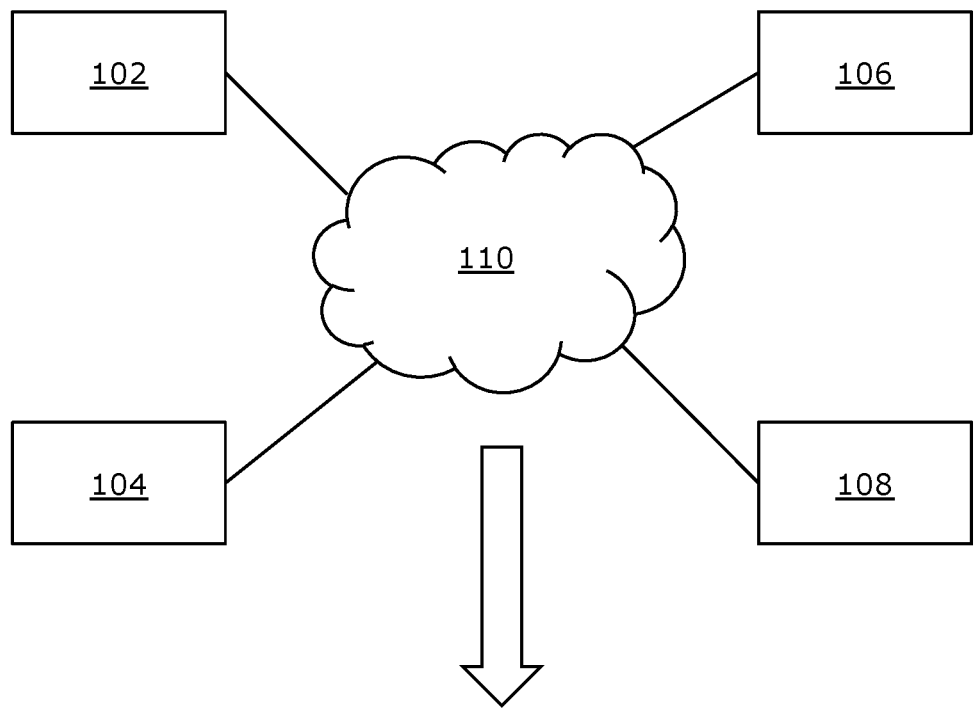
FIG. 1 is a schematic illustration of a resource management system configured to maintain one or more records relating to one or more transactions associated with one or more resources, in accordance with an embodiment of the present disclosure.
Figure 1:
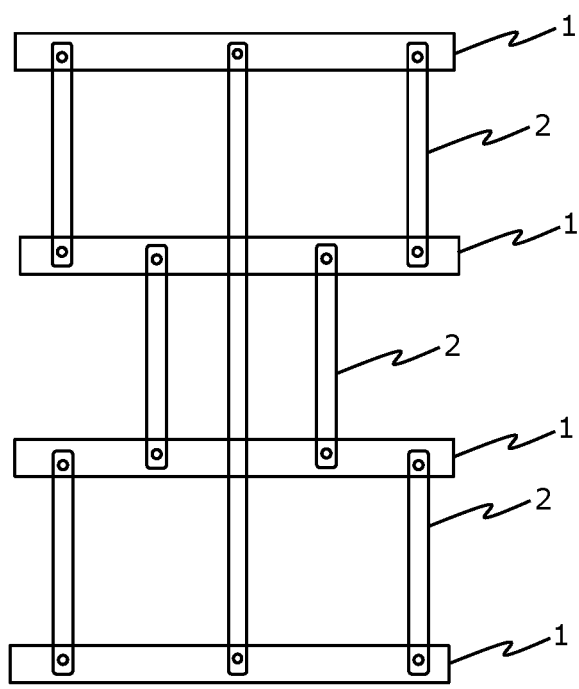

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a resource management system that is configured to maintain one or more records relating to one or more transactions associated with one or more resources, wherein the resource management system is implemented as a distributed ledger arrangement including one or more data processing nodes that are mutually coupled via a data communication network, the data communication network being a computer network characterised in that:

(i) the one or more records are maintained in one or more corresponding chains, wherein each chain includes a temporally defined sequence of verified entries, wherein each entry defines one or more corresponding transactions relating to one or more corresponding resources;

(ii) when at least one new entry is to be made to a given chain, information concerning the at least one new entry is communicated to the one or more data processing nodes of the resource management system for verifying whether or not the at least one new entry is valid for recording to the given chain;

(iii) the resource management system records the at least one new entry when verified to its corresponding given chain; and (iv) the resource management system includes a filter arrangement for limiting communication regarding the at least one new entry to be made only to a subset of the one or more data processing nodes of the resource management system for verifying the at least one new entry to reduce an amount of computing effort and data communication occurring within the resource management system required for processing the at least one new entry.

In another aspect, an embodiment of the present disclosure provides a method of operating a resource management system that is configured to maintain one or more records relating to one or more transactions associated with one or more resources, wherein the resource management system is implemented as a distributed ledger arrangement including one or more data processing nodes that are mutually coupled via a data communication network, characterised in that the method includes:

(i) maintaining the one or more records in one or more corresponding chains, wherein each chain includes a temporally defined sequence of verified entries, wherein each entry defines one or more corresponding transactions relating to one or more corresponding resources;

(ii) when at least one new entry is to be made to a given chain, communicating information concerning the at least one new entry to the one or more data processing nodes of the resource management system for verifying whether or not the at least one new entry is valid for recording to the given chain;

(iii) using the resource management system to record the at least one new entry when verified to its corresponding given chain; and (iv) using a filter arrangement of the resource management system includes for limiting communication regarding the at least one new entry to be made only to a subset of the one or more data processing nodes of the resource management system for verifying the at least one new entry to reduce an amount of computing effort and data communication occurring within the resource management system required for processing the at least one new entry.

In yet another aspect, an embodiment of the present disclosure provides a computer program product comprising a non-transitory computer-readable storage medium having computer-readable instructions stored thereon, the computer-readable instructions being executable by a computerized device comprising data processing hardware to execute a method of operating a resource management system.

Throughout the present disclosure, the term "resource" refers to one or more digital assets that work as a medium of exchange during a transaction. Furthermore, the resources have a value associated therewith, such that, the resources can be exchanged in part (such as, for a partial value) or in full (such as, for a full value) during a transaction. Moreover, the resources may be transferred from one entity (such as an owner thereof) to another during transactions associated therewith.

Throughout the present disclosure, the term "transaction" refers to exchange of services, information and so forth between two or more entities. Such a transaction may involve remuneration of the one or more resources by one entity, for services offered by another entity. Furthermore, the entities of the one or more resources may be parties (such as owners) that hold control of the resources in the resource management system. Furthermore, one or more transactions have one or more records related thereto. Specifically, the records may be data, facts, logs and other details associated with the one or more transactions. For example, the records can contain information associated with one or more resources utilized during the transactions. Moreover, the records may be maintained in a list, a stack, a double-ended-queue, Merkle tree, a binary tree or any other data structure suitable for storing the records. Specifically, each record in the data structure is associated to any one of the one or more transactions.

As an example, a transaction may be data within a data processor which represent a parameter describing a sensed or measured voltage, current, mass or similar.

Pursuant to embodiments of the present disclosure, the term "resource management system" refers to a system for maintaining one or more records related to one or more transactions associated with one or more resources. The resource management system updates and manages the records related to the transactions associated with the resources in a way to reduce processing-complexity and time-requirement for performing a new transaction (such as, for validating a successful transaction, as explained in detail herein later). Specifically, the resource management system reduces processing-complexity of updating records related to the new transaction and the resources associated therewith.

Pursuant to embodiments of the present disclosure, the one or more records relating to the one or more transactions are to be maintained so as to prevent fraudulent cases. By recording the one or more transactions associated with the one or more resources, for example, a technical resource, the aforementioned system provides transacting parties involved in the one or more transactions with a proof for participating in the one or more transactions of the technical resource.

Furthermore, the resources management system is implemented as a distributed ledger arrangement. Throughout the present disclosure, the term "distributed ledger arrangement" refers to a ledger (such as a database) of operations and/or contracts. In this regard, the ledger is consensually shared and synchronised across multiple sites, institutions or geographies. Pursuant to embodiments of the present disclosure, the distributed ledger arrangement refers to a database of the one or more records, wherein the one or more records comprise information relating to the one or more transactions therein. Moreover, the distributed ledger arrangement is consensually shared and synchronised in a decentralised form across the one or more data processing nodes. Optionally, such data processing nodes are established across different locations and operated by different users. Beneficially, the distributed ledger arrangement eliminates the need of a central authority to maintain and protect against manipulation. Specifically, the one or more records in the distributed ledger arrangement are monitored publicly, thereby making the distributed ledger arrangement robust against attacks. Such distributed ledger arrangement may be implemented using a public and non-permissioned ledger. However, it will be appreciated that the distributed ledger arrangement may be implemented in any other implementation, such as a private and permissioned ledger. Yet alternatively, a public permissioned ledger or a private non-permissioned ledger is optionally employed.

It will be appreciated that the one or more data processing nodes in the distributed ledger arrangement may access each of the one or more records in the distributed ledger arrangement and may own an identical copy of each of the one or more records. Notably, an alteration made to the distributed ledger arrangement is reflected almost instantly to each of the one or more data processing nodes. Subsequently, an alteration (such as addition of a record in the distributed ledger arrangement) is done when all or some of the one or more data processing nodes perform a validation with respect to the alteration. In such case, the record is maintained (namely, added) in the distributed ledger arrangement in an immutable form when at least a threshold number of data processing nodes from the one or more data processing nodes reach a consensus that the records is valid. Alternatively, maintaining of the record is denied when the threshold number of data processing nodes reach a consensus that the record is invalid. In an example, the threshold number of data processing nodes to reach a consensus may be fifty-one percent (51%) of the one or more data processing nodes. Optionally, information in the distributed ledger arrangement is stored securely using cryptography techniques. Beneficially, the distributed ledger arrangement allows reliable and transparent maintenance of the one or more records, in that the information relating to the one or more transactions (for example, exchange of a technical resource over the data communication network) are permanently recorded and may not be capable of alterations. Thus, the distributed ledger arrangement provides greater transparency, enhanced security, improved traceability, increased efficiency and speed of transactions.

The system requires the presence of one or more data processing nodes that are mutually coupled via a data communication network to perform the method steps. The data communication network is a network of devices, typically a computer network, which are capable of data communication. The term "one or more data processing nodes" relates to computational elements that are operable to respond to, and processes instructions that drive the resources management system. Optionally, the one or more data processing nodes includes, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the one or more data processing nodes can be one or more individual processors, processing devices and various elements associated with a processing device that may be shared by other processing devices. Additionally, the one or more data processing nodes, processing devices and elements are arranged in various architectures for responding to and processing the instructions that drive the system. Beneficially, such arrangement of the one or more data processing nodes provides adaptability and flexibility to the distributed nature of the resources management system.

Moreover, optionally, the one or more data processing nodes are communicably coupled to each other via a data communication network. The data communication network allows for communication among the one or more data processing nodes. In other words, each of the one or more data processing nodes are capable of communicating with other data processing nodes via the data communication network.

Notably, the "data communication network" refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system.

In an embodiment, the data communication network is implemented as a distributed peer-to-peer (P2P) network of interconnected data processing nodes. Specifically, the distributed peer-to-peer network may be capable of performing transactions directly between entities (such as owners) corresponding to the one or more resources.

Additionally, the resource management system as described in the present disclosure optimizes the operation of maintaining of one or more records in the distributed ledger in terms of run-time. Specifically, the resource management system does not encounter decreased run time owing to an increase in a number of the one or more data processing nodes. More specifically, the system operates to perform at an optimum speed without any scaling in initial resources (for example, computing power, energy consumption, and so forth) to implement the process involved therein, thereby making the system more efficient and effective.

Additionally, with a gradual increase in the data processing nodes in the distributed ledger arrangement, the system, however, does not compromise in terms of security and speed, thereby making the system secured, advantageous and economic in terms of operation.

Throughout the present disclosure, the term "one or more records" refers to information constituting an evidence relating to the one or more transactions. Specifically, the one or more records comprise information with regard to the one or more transactions, wherein the one or more records may be kept (for example, stored) in a permanent manner for future reference. Optionally, the information comprised in a given record relating to a given transaction associated with a given resource include, for example, information relating to a buyer of the given resource, information relating to a seller of the given resource, information relating to the given resource offered by the seller for the given transaction, information relating to an amount offered by the buyer for the given transaction, a time of the given transaction, at least one account (such as, an online wallet, a bank account, and so forth) relating to the given transaction, and so forth. Beneficially, the one or more records provide an evidence for the occurrence of the one or more transactions thereby eliminating fraudulent cases and malicious activities relating to a fake or dummy transaction. In an example, a given transaction record may comprise names of users associated with the given transaction 'Alice' and 'Bob', a technical resource provided by the user 'Alice' '100 Giga Hertz of processing power', a resource offered by the party 'Bob'10 Tera bytes of storage memory', a date of the given transaction '31 Jan. 2019', a time of the given transaction '14:45'.

Optionally, the one or more data processing nodes may be implemented in a layered architecture. Such a layered architecture of the data processing nodes may include a P2P connectivity layer, a resolution layer, a fork management layer, a storage layer, a chain layer, a filter arrangement, and a client layer. The P2P connectivity layer enables management of connections of a data processing node with other data processing nodes. The resolution layer enables to resolve conflicts associated with various transactions within the resource management system (explained in detail herein later). Moreover, the fork management layer enables to resolve conflicting suggestions associated with state of the resource management system. The storage layer includes one or more storage components. Such storage components keep a record of an absolute state of the resource management system. Furthermore, the chain layer enables tracking of changes in the absolute state of the resource management system, in response to the transactions being performed. The filter arrangement enables evaluation of the transactions being performed (explained in detail herein later). The client layer may be responsible for providing an interface for wallets and/or programs to interact with the resource management system. In an embodiment of the invention, a multitude of the components, described above, exist within a data processing node with various degrees of connectivity to other data processing nodes.

In the present disclosure, users associated with the one or more data processing nodes are able to access the resource management system via one or more of its computing nodes, for example using software applications that encrypt and/or decrypt data flowing therethrough to improve robustness and security of the operation. Thus, it will be appreciated that the users are entities associated with the one or more data processing nodes included in the resource management system. Optionally, the users are persons having knowledge pertaining to at least one of: finance, accounting, banking, commerce. Optionally, in this regard, the users are independent participants performing the one or more transactions, or participants employed by at least one firm offering transaction services. More optionally, the users are software applications (namely, web bots) that runs automatically to perform the one or more transactions to be maintained as one or more records.

Optionally, the P2P connectivity layer and the client layer are identical, to enable connection between external clients and the service provider. Optionally, the resource management system is configured to function as a resource ledger. For example, the resource management system is implemented as a distributed ledger. Such a distributed ledger can exist as a plurality of copies thereof on various computing devices that may be arranged at different geographical locations. Furthermore, the plurality of copies of the distributed ledger can communicate with each other, such as, to converge on a single consensus (such as the absolute state of the resource management system) without a centralized authority to supervise the communication. Such a resource ledger may be implemented using a public and non-permissioned ledger. However, it will be appreciated that the resource ledger can be implemented with any other architecture and access rights thereof, such as, a private and permissioned ledger.

Furthermore, the resource ledger comprises one or more chains (referred to as "transaction chains" or "transaction lanes" throughout the present disclosure). The term "chains" as used herein, refer to a group of the one or more records relating to one or more transactions associated with one or more resources. Each chain includes a temporally-defined sequence of verified entries (such as records), wherein each entry defines one or more corresponding transactions relating to one or more corresponding resources. Furthermore, each record associated with each transaction maintained in the chain, contains information about the one or more resources associated with the transaction. For example, the information about the one or more resources may be explicitly recorded in the corresponding records, implicitly recorded in the corresponding records and/or may be included in a contract associated with each of the transactions. Optionally, such contract may be a smart contract.

Furthermore, each chain can be split into two or more further chains (referred to as "daughter chains" throughout the present disclosure), in order to scale the resource management system to accommodate one or more additional transactions. Moreover, splitting of the chain increases a transaction capacity of the resource management system with respect to time, such that with passage of time, more transactions can be accommodated by the resource management system. Such an increase in the transaction capacity of the resource management system increases parallelism and/or modularity of the transactions associated with the resources.

Optionally, the entries related to the one or more resources are verified in order to authenticate and validate information related to the one or more transaction associated with the one or more resources. In an example, entries may be verified by transaction validators, who may be accredited and trusted to validate one or more transactions. In another example, the one or more entries may be verified by a consensus mechanism involving communication between the one or more processing nodes. Additionally, the one or more records relating to one or more transactions include data associated with the one or more resources and previous transactions related thereto. Furthermore, each of the one or more resources is related to a resource identifier (namely, a byte array) representing a number, a string, or any other data that may be represented by bytes. The resource identifier contains specific information, such as the resource name, address of the resource, resource chunk, and so forth. Furthermore, the one or more resources are grouped into chains and within each of the chains, the one or more resources are defined in sequences based on a time of transaction associated therewith. Additionally, the one or more transactions associated to a temporally-defined sequence comprise parallel transactions.

Furthermore, each of the one or more records maintained in a chain are associated to the one or more transactions. Specifically, the one or more records maintained in a chain relates to an entry associated with one or more transactions. Moreover, at an instance when a new transaction is required to be performed, an entry relating to the one or more records associated to the new transaction is made to the given chain. Additionally, such an entry relating to the one or more records requires to be validated for authenticity thereof in order to prevent double-spending (namely, spending of a same resource twice).

Additionally, information about the one or more resources associated with the one or more transactions may be explicitly or implicitly recorded in the corresponding one or more records and/or may be implicit or explicit in a smart contract associated with the one or more transactions. Additionally, the one or more transactions may be associated with a plurality of one or more resources. Optionally, each record related to a transaction may refer to a number of previous transactions corresponding to the transaction (as explained in detail herein later).

As mentioned previously the one or more records are maintained in one or more corresponding chains. Notably, each chain includes a temporally defined sequence of verified entries. Additionally, each entry defines one or more corresponding transactions relating to one or more corresponding resources. Furthermore, chains refer to a group of the one or more resources relating to one or more transactions associated with one or more records thereof. Specifically, the entries related to the one or more resources are verified in order to authenticate and validate related the one or more transaction associated with the one or more resources. In an example, entries may be verified by transaction validators, who may be accredited and trusted to validate one or more transactions. Additionally, the one or more records relating to one or more transactions include data associated to the one or more resources and previous transactions related thereto. Furthermore, each of the one or more resources is related to a resource identifier (namely, a byte array) representing a number, a string, or any other data that may be represented by bytes. The resource identifier contains specific information such as the resource name, address of the resource, resource chunk etc. Furthermore, the one or more resources are grouped into chains and within each of the chains the one or more resources are defined in sequences based on a time of transaction associated thereto.

Additionally, the one or more transactions associated to one temporally-defined sequence are parallel transactions. Furthermore, each of the one or more records maintained in a chain are associated to the one or more transactions. Specifically, the one or more records maintained in a chain relates to an entry related to the one or more transactions associated thereto. Moreover, at an instance when a new transaction is required to be performed, an entry relating to the one or more records associated to the new transaction is made to the given chain. Additionally, such entry relating to the one or more records requires to be validated for authenticity thereof in order to prevent double-spending (namely, spending same resource twice).

Optionally, the one or more records associated with the one or more transactions may include information such as, a list of transaction resources, a transaction body, a transaction hash and a transaction signature.

Furthermore, when at least one new entry is to be made to the given chain, information concerning the at least one new entry is communicated to the one or more data processing nodes of the resource management system, for verifying whether or not the at least one new entry is valid for recording to the given chain. The given chain for the at least one new entry relates to a transaction chain having groups of the one or more resources and the one or more records associated with the transaction related to the at least one new entry. Furthermore, the information concerning the at least one new entry is communicated to the one or more data processing nodes through the data communication network. The information concerning the at least one new entry includes transaction resources, transaction body, proof of work, proof of stake, voting, transaction identifier and so forth. Furthermore, the one or more data processing nodes analyse the information concerning the at least one new entry, for verifying the at least one new entry to be made to the given chain. Moreover, verifying the at least one new entry relates to validating the at least one new entry for establishing authentication and reliability thereof. Beneficially, verifying the at least one new entry prior to addition thereof to the given chain substantially reduces unauthenticated and forged transactions. Additionally, the at least one new entry is made to each of the chains related to the one or more resources associated with the transaction.

As mentioned previously, the resource management system includes the filter arrangement for limiting communication regarding the at least one new entry to be made only to the subset of the one or more data processing nodes of the resource management system, for verifying the at least one new entry, to reduce the amount of computing effort and data communication occurring within the resource management system required for processing the at least one new entry. Furthermore, the filter arrangement is operable to identify the subset of one or more data processing nodes from the one or more data processing nodes included in the distributed ledger arrangement. The one or more data processing nodes included in the subset of the one or more data processing nodes have a capability of identifying and authenticating the one or more resources and the one or more records associated with the at least one new entry related to the one or more new transactions. Beneficially, preselection of the subset of the one or more data processing nodes of the resource management system, for verifying the at least one new entry reduces time and processing capacity required for verifying the new entry. Furthermore, such pre-selection of the subset of the one or more data processing nodes of the resource management system for verifying the at least one new entry requires minimal data communication among the one or more data processing nodes included in the subset. In an example, more than one new entry may be verified simultaneously by pre-selecting more than one subset of the one or more processing nodes. It will be appreciated that verifying the at least one new entry is performed to determine a validity of the one or more transactions. Additionally, when the one or more transactions adheres to a predefined set of rules, (such as, it is formatted correctly, sufficient one or more resources are available for use in the one or more transactions and so forth) the one or more transactions are determined to be valid.

In an embodiment, the filter arrangement is configured to pre-select the subset of the one or more data processing nodes for balancing data processing and/or data communication load associated with the one or more chains within the resource management system. Furthermore, the pre-selection of the subset of the one or more data processing nodes substantially eliminates requirement of verifying a new entry within each of the one or more chains. The pre-selected subset of the one or more data processing nodes verifies the new entry associated with the one or more resources, by communicating to chains having relevance and a direct or indirect association with the new entry. Furthermore, the one or more data processing nodes verify the new entry by authenticating the one or more records associated therewith, wherein the records are maintained in the one or more chains. Beneficially, verification of the new entry by the pre-selected subset of the one or more data processing nodes, substantially reduces the amount of data processing and data communication associated with the one or more new transactions.

Throughout the present disclosure, the term "Persistent token" refers to a parameter that, for example, represents a sensed value or quantity of a real physical resource or derivative thereof; the term may also be understood as a digital unit or element that serves as a medium of exchange. Furthermore, the value token allows for instantaneous transactions and borderless transfer-of-ownership. Moreover, the number of Persistent Tokens in the system may be predefined, or may be determined dynamically, when the system is in operation. Additionally, such Persistent Tokens can be used when buying, exchanging or performing the one or more transactions. At an instance, such values tokens may refer to digital currency, cryptocurrency, alternative currency and the like, but are not limited thereto.

Optionally, tokens processed by a data processing arrangement are transacted via the data communication network, for example implemented as a peer-to-peer network including the one or more mutually interconnected data processing nodes. The peer-to-peer network is potentially temporally dynamically changing in its nodal interconnectivity, and the trustworthiness of some of the data processing nodes is often unverified. Moreover, in the data communication network, the Persistent Tokens are employed when performing interactions between the one or more data processing nodes. The one or more data processing nodes connected by the data communication network perform transactions of the Persistent Tokens therebetween. Furthermore, the one or more data processing nodes connected by the data communication network are non-uniform and dynamic, for example mobile and therefore varying in spatial location thereof. Additionally, the one or more data processing nodes connected by the data communication network are potentially spread over an extensive geographical area, for example over a given country or continent.

Optionally, each of the one or more data processing nodes in the data communication network may have a direct association therebetween.

Specifically, the direct association occurs when the peer-to-peer network performs the one or more transactions directly between the one or more data processing nodes corresponding to the Persistent Tokens.

Optionally, the data processing arrangement is operable to perform computational operations associated with the one or more transactions; as will be described in more detail later, processing the one or more transactions requires use of a computing arrangement that is configured to process information relating to the one or more transactions in a deterministic von Neumann synchronous computing architecture. Such a computing architecture employs clock cycles to implement processing tasks, wherein the computing architecture is typically multitasking when in operation and is costly in terms of initial hardware and energy consumption when in operation. It is therefore highly desirable for the data communication network when performing the one or more transactions that its computing cycles are employed effectively to process the one or more transactions rather than merely idling to little benefit to the data communication network. Such issues are of a technical nature and pertain to computing efficacy.

Additionally, the data processing arrangement controls the one or more transactions of the tokens between the one or more data processing nodes. Specifically, the data processing arrangement communicates with each of the one or more data processing nodes participating in processing the one or more transactions. Additionally, the data processing arrangement is further operable to maintain one or more records associated with the one or more transactions between one or more data processing nodes connected by the data communication network. In an example embodiment of the present disclosure, the data processing arrangement is a server that controls the one or more transactions and maintain the one or more records associated with the one or more transactions.

Furthermore, the data processing arrangement refers to a structure and/or module that include programmable and/or non-programmable components configured to store, process and/or share information related to the one or more transactions. Optionally, the data processing arrangement includes any arrangement of physical or virtual computational entities capable of enhancing information to perform various computational tasks. Furthermore, it will be appreciated that the data processing arrangement may be implemented as a hardware server and/or plurality of hardware servers operating in a parallel or in a distributed architecture. Optionally, the servers are supplemented with additional computation devices, such as neural networks and hierarchical clusters of pseudo-analog variable state machines implementing artificial intelligence algorithms. In an example, the data processing arrangement may include components such as memory, a processor, a network adapter and the like, to store, process and/or share information with other computing components, such as the one or more data processing nodes. Optionally, the data processing arrangement is implemented as a computer program that provides various services (such as database service) to other devices, modules or apparatus. Moreover, the data processing arrangement refers to a computational element that is operable to respond to and processes instructions to perform the transactions. Optionally, the data processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit, for example as aforementioned. Furthermore, the data processing arrangement may refer to one or more individual processors, processing devices and various elements associated with a processing device that may be shared by other processing devices. Additionally, data processing arrangement is arranged in various architectures for responding to and processing the instructions for performing the one or more transactions related to the tokens in the resource management system.

Furthermore, at least a first portion of the tokens are Persistent Tokens that are representative of one or more values of the one or more resources. Additionally, the Persistent Tokens are associated with the one or more values representing merit (such as worth, significance, usefulness, technical functionality, and so forth) of the one or more resources such as a fiat currency, cryptocurrency, gems, or any other asset having an economic value associated thereto. Furthermore, the one or more values of the one or more resources are dynamic in nature. Consequently, the one or more values of the one or more resources associated with the Persistent Tokens increases or decreases depending upon economic value of the one or more resources. At an instance, a person having one or more Persistent Tokens may intend to hold thereto until an increase in the one or more values of the one or more resources associated with the Persistent Tokens is observed. At such an instance, holding on to the Persistent Tokens leads to a profit to the person having the one or more Persistent Tokens. Furthermore, the number of Persistent Tokens in the system may be predefined or may be defined dynamically based on requirement thereof in the system. Furthermore, the Persistent Tokens are tradable within the system. Specifically, the Persistent Tokens may be exchanged for one or more tokens, alternative currency, or any other asset in the system that has an economic value associated thereto. Moreover, the one or more transactions in the system are supported by the Persistent Tokens.

Furthermore, at least a second portion of the tokens are Transient Tokens that represent one or more data processing resources of the data processing arrangement used for processing the one or more transactions of the Persistent Tokens. Specifically, the Transient Tokens refer to a representation of an integer or quantum of data processing capacity within the system that has associated therewith a corresponding number of computing devices with associated power dissipation within associated computing hardware. The data processing arrangement comprises one or more data processing resources that can be used to process the transactions. Additionally, the data processing resources may be one or more processing units connected to each other in any architecture (such as centralized, distributed, pipelined client-server and so forth). In an example embodiment, a transaction may require one or more data processing resources for execution thereof. In such an embodiment, the Transient Tokens represent the cost of one or more data processing resources associated with processing, namely executing, the transaction. Additionally, a number of the Transient Tokens in the system may be predefined. Alternatively, the Transient Tokens may be created based on technical requirements in the system, for example a total aggregate computation load required to maintain the system in operation.

Optionally, the system may create new types of tokens such as tertiary tokens, quaternary tokens, quinary tokens and the like. Such new types of tokens may be used in the one or more transactions associated with the one or more resources being executed within the system. Additionally, the new types of tokens may have constraints upon utilization and transactions thereof. Furthermore, creation and lifetime properties of the new types of tokens may be decided based upon constraints thereof. Moreover, such new types of tokens may be used within the system as well as outside the system as per requirements thereof.

Optionally, each of the aforementioned tokens (namely, the Persistent Tokens and the Transient Tokens) may have a unique identifier thereof. Such an identifier may be operable to identify uniquely a type of a token, a temporal lifetime of the tokens and so forth. Furthermore, the identifiers may also be used to retrieve information associated with the tokens, for example from a distributed database (namely, the distributed ledger arrangement) within the system. In an example embodiment of the present disclosure, such identifiers may be a string of one or more binary digits, numbers, alphabets, alphanumeric strings, a symbol or any other combination that may be operable to identify the tokens uniquely.

The present disclosure further provides a system and a method of using the system for processing transactions of tokens within the system. The present disclosure provides a scalable and non-stagnant system for trading, exchanging and transacting tokens. Additionally, the present disclosure provides a common platform for investing in tokens. Moreover, the system described herein allows for transactions of tokens that prevent malicious activities within the system. Specifically, the system operates to process tokens that comprise of persistent tokens and transient tokens. Furthermore, transactions associated with such collaborative tokens enable effective and secure transactions within the system thereby making the system reliable in terms of security and usability. Moreover, the system makes usage of transacted tokens more convenient by allowing seamless exchange of the first proportion of tokens (namely, the Persistent Tokens) to fiat currencies thereby maintaining uniformity between the tokens and the corresponding fiat currencies. Furthermore, the system enables convenient exchange of the second portion of tokens (namely, the Transient Tokens) within the system thereby preventing stagnation of tokens in the system and hampering utility thereof. Additionally, the system substantially reduces the problem of validation of tokens during transaction thereof. Consequently, the system provides an efficient, faster and optimal approach for performing and recordal of transactions in the distributed ledger.

Optionally, the filter arrangement is configured to pre-select the subset of the one or more data processing nodes for balancing data processing and/or data communication load associated with the one or more chains within the resource management system. Beneficially, the pre-selection of the subset of the one or more data processing nodes substantially eliminates requirement of verifying a new entry within each of the one or more chains. The pre-selected subset of the one or more data processing nodes verifies the new entry associated with the one or more resources, by communicating to chains having relevance and a direct or indirect association with the new entry. Furthermore, the one or more data processing nodes verify the new entry by authenticating the one or more records associated therewith, wherein the records are maintained in the one or more chains. Beneficially, verification of the new entry by the pre-selected subset of the one or more data processing nodes, substantially reduces the amount of data processing and data communication associated with the one or more new transactions.

Optionally, the filter arrangement is configured to pre-select the subset of the one or more data processing nodes depending upon information relating to a plurality of earlier entries recorded in the given chain to which the at least new entry to be verified is to be recorded. Furthermore, the one or more data processing nodes included in the pre-selected subsets for verifying the plurality of earlier entries recorded in the given chain, may be included in the subset of one or more data processing nodes for verifying the at least one new entry. Alternatively, the one or more data processing nodes related to the one or more transactions associated with the plurality of earlier entries recorded in the given chain, may be pre-selected as the subset of one or more data processing nodes for verifying the at least one new entry to be recorded to the given chain. In an example, the filter arrangement may access information, such as, a list of transaction resources, a transaction body, a transaction hash and a transaction signature, associated with the one or more records for verification thereof.

More optionally, the filter arrangement is configured to pre-select the subset of the one or more data processing nodes depending upon a group of resources that are mutually related, for which the at least one new entry is to be validated. Furthermore, the one or more data processing nodes associated with the one or more transactions relating to the group of mutually related resources may be pre-selected as the subset of one or more processing nodes. Specifically, the one or more processing nodes relating to the group of mutually related resources may be associated with one or more pre-selected subsets for verifying entries relating to the one or more transactions associated with the group of mutually related resources. Alternatively, the one or more processing nodes associated with the one or more transactions associated with the group of mutually related resources may be pre-selected as the subset of the one or more data processing nodes for verifying the at least one new entry.

Furthermore, optionally, the filter arrangement is configured to pre-select the subset of the one or more data processing nodes depending upon a group of transactions that are mutually related, for which the at least one new entry is to be validated. Furthermore, the subset of the one or more data processing nodes that are preselected for verifying entries associated with the group of mutually related transactions, may be pre-selected for verifying the at least one new entry related to the group of mutually related transactions. Additionally, the at least one new entry may be an operation related to a previous transaction or a new transaction related to the one or more resources associated with the group of mutually related transactions. Beneficially, the subset of the one or more processing nodes preselected for verifying entries associated with the group of mutually related transactions may have information associated with the group of mutually related transactions. Such information may be relevant in verifying the at least one new entry. Therefore, at such an instance the data processing and data communication for verifying the at least one new entry may get reduced substantially.

Optionally, the filter arrangement is configured to pre-select the subset of the one or more data processing nodes depending upon information relating to entities associated with one or more transactions associated with the at least one new entry to be validated. Furthermore, the subset of the one or more data processing nodes may be pre-selected based on information associated with earlier one or more transactions of the entities associated with one or more transactions associated with the at least one new entry to be validated. Additionally, the one or more data processing nodes that are pre-selected to verify entry of the earlier one or more transactions of the parties associated with one or more transactions associated with the at least one new entry to be validated, may be preselected as the subset of the one or more data processing nodes for verifying the new entry to the given chain.

More optionally, the filter arrangement is configured to pre-select the subset of the one or more data processing nodes depending upon a group of chains that are mutually related, and that are related to the at least one new entry to be validated. Furthermore, the group of chains that are mutually related may have common one or more resources. The one or more resources and the one or more records associated thereto used in the one or more transactions, may be associated to the group of chains that are mutually related. Furthermore, the subset of the data processing nodes used to verify corresponding entries of such one or more transactions and/or the data processing nodes used to perform the one or more transactions, may be associated to the group of chains that are mutually related. Subsequently, such one or more data processing nodes may be pre-selected as the subset of one or more data processing nodes, for verifying the at least one new entry to the given chain for which the at least one new entry is to be validated. Specifically, the given chain may belong to the group of chains that are mutually related. Alternatively, the given chain may have a direct or indirect association with the group of chains that are mutually related.

Furthermore, optionally, the filter arrangement is configured to pre-select the subset of the one or more data processing nodes depending upon a manner in which one or more chains have been previously split into one or more daughter chains onto which the at least one new entry is to be recorded. Specifically, the one or more daughter chains may be transaction chains formed by dividing the one or more existing chains into one or more chains. Additionally, the daughter chains may be formed in such a way that the one or more resources associated with the one or more existing chain may get divided therebetween. Moreover, the division of that the one or more resources, associated with the one or more existing chain, among daughter chains thereof may determine the manner in which the one or more chains have been split. In an example, at an instance when one or more chain is split into two daughter chains and first 50% one or more resources may be maintained in first daughter chain and remaining 50% one or more resources may be maintained in second daughter chain. At such an instance, one or more data processing nodes associated with the one or more transactions relating to the one or more resources maintained in the first daughter chain may be pre-selected as subset of one or more data processing nodes for verifying a new entry to given chain. Alternatively, first 50% of the one or more data processing nodes associated with the one or more resources in any of the daughter chains may be preselected as the subset of the one or more data processing nodes for verifying a new entry to given chain. Additionally, alternatively, first 50% of the one or more data processing nodes associated with the one or more resources in the one or more chains may be preselected as the subset of the one or more data processing nodes for verifying a new entry to given chain. It is to be understood that any other manner for splitting the one or more resources maintained in the one or more chains may also be used to pre-select the subset of the one or more data processing nodes for verifying the at least one new entry to the given chain.

Optionally, scalability of the resource management system can be expanded by introducing more chains. Furthermore, the resource management system may be scaled by splitting the chains into daughter chains. Additionally, the daughter chains may refer back to previous chains. In an embodiment, the splitting is done in multiples of two, but in other embodiments, any splitting factor may be used. In an example, hash values of identifiers associated with previous one or more transactions associated with previous chains, may be used by daughter chains in order to refer back to previous chains.

Optionally, splitting of chains into daughter chains may be performed by using hash functions such as SHA256 or the like, as these hash functions take any set of strings and map them into a set of uniformly distributed numbers. In an example, the splitting of chains may be performed using a hash function H and applying the hash function H to every resource identifier to obtain a resource location. Furthermore, if the hash function generates random distribution of hash value associated with the hash function H then, distribution of resource locations will be uniform and will provide a good mechanism for splitting the chains and distributing the one or more resources across groups. Optionally, at an instance when the resource management system uses four chains, the first 2 bits of each of the resource locations may be used to determine a chain to which a transaction belongs. At another instance, when the resource management system has 8 groups, the first 3 bits may be used to determine the resource location. Furthermore, if the resource management system has N groups, the resource location may be determined using the first $\log 2(N)$ bits. Beneficially, this may distribute resources through resource grouping to the respective chains. Additionally, the resource management system is very flexible and enables to expand the number of chains to a point where each of the one or more resources has own chains thereof, or collapse to the point where all transactions are contained in a single chain.

Optionally, grouping of resources into separate chains increases parallelism of the resource management system. Furthermore, the resources may be randomly allocated to each chain using a hash function approach described above. Additionally, optionally, the one or more resources may remain permanently in the same chain, except after a splitting event when the one or more resources may be allocated to one of the daughter chains. Other embodiments could further exploit the resource management system's parallelism by grouping resources into chains, according to more specific criteria as the chains are created, or by dynamically re-grouping resources into different chains throughout a lifetime thereof. Examples of such grouping criteria includes grouping together resources that transact more frequently with each other, grouping resources according to verifiable geographic locations or according to communication rates with a trusted external oracle. Other criteria for selectively grouping resources may include balancing absolute transaction number or the value of transactions between chains to increase their security and/or the transaction processing rates. The transaction load balancing could allow the one or more data processing nodes to maintain partial copies of the resource management system, which would decrease the cost of participating in the network and improve its decentralization.

Optionally, the filter arrangement is configured to pre-select the subset of the one or more data processing nodes depending upon information relating to proof-of-work, proof-of-stake, election of the at least new entry to be verified relating to one or more resources associated with the at least one new entry to be validated. Furthermore, proof-of-work refers to validating the one or more transactions and a particular data processing node asserting the correctness of the one or more transactions. Specifically, the proof-of-work may be a mathematical puzzle that may be needed to be solved in order to assert the validity of the one or more transactions. Beneficially, the proof-of-work is used to establish authentication of the one or more records associated with the transactions and a consensus between data processing nodes related to the one or more transactions. Subsequently, the one or more data processing nodes having a proof-of-work may be pre-selected as the subset of one or more data processing nodes for verifying the at least one new entry to the given chain. Moreover, proof-of-stake refers to an alternative way that aims to verify and validate the one or more transactions. Specifically, a validator holds a stake in the one or more resources and provides proof relating to amount of the stake. The validator having a higher stake, age of the stake combined with various other factors, gets a higher chance of validating the one or more transactions. Additionally, the validator may be associated with the one or more data processing nodes. Subsequently, the one or more data processing nodes having a proof-of-stake may be pre-selected as the subset of one or more data processing nodes for verifying the at least one new entry to the given chain. Furthermore, the one or more data processing nodes may also establish validity of the at least one new entry associated with the one or more transactions, by voting in favour thereof. Additionally, such one or more data processing nodes that are capable of voting, may be pre-selected as the subset of the one or more data processing nodes for verifying the at least one new entry.

Furthermore, optionally, the filter arrangement is configured to pre-select the subset of the one or more data processing nodes depending upon management of responsibility across the one or more data processing nodes when data is distributed across one or more chains associated with the at least one new entry to be verified. Specifically, the management of responsibility of refers to distribution of responsibility, to maintain the one or more records and the related one or more resources associated with the one or more transactions among the one or more data processing nodes. In an example, the one or more data processing nodes having responsibility of maintaining one or more records and related to the one or more resources in the given chain may be pre-selected as subset of one or more data processing nodes for verifying the at least one new entry to the given chain.

Optionally, the filter arrangement is configured to pre-select the subset of the one or more data processing nodes depending upon a grouping of resources that are frequently traded with one and another. Furthermore, the grouping of resources that are frequently transacted may have one or more data processing nodes associated thereto. Such one or more data processing nodes may already have retrieved information related to the group of resources. At an instance when at least one new entry having an association with any of the one or more resources in the group of resources has to be verified, the one or more data processing nodes having retrieved information related to the group of resources may be pre-selected as the subset of the one or more data processing nodes for verifying the at least one new entry.

More optionally, the resource management system includes a resolution arrangement for resolving conflicting validations for the at least one new entry to be recorded against one or more chains. Furthermore, a conflicting validation may arise when one or more data processing nodes have different one or more records associated with a specific resource. Moreover, a conflicting validation may arise when a plurality of the one or more data processing nodes attempts to perform read as well as write operations simultaneously on a specific record associated with the one or more transactions. It is to be understood that there may be other instances for occurrence of conflicting validations. Subsequently, the resolution management may be operable to resolve the conflicting validations for the at least one new entry based on a plurality of proofs associated therewith.

Furthermore, optionally, the resolution arrangement is controlled based upon a consensus from a plurality of proofs provided in response to the conflicting validation arising within the resource management system. Specifically, the resolution arrangement may work by computing total amount of the one or more transactions (in the case of proof-of-work) that has been added to the records across each of the chains. Subsequently, the version of the one or more records with the most transactions associated therewith becomes the globally agreed consensus. Specifically, consensus refers to a general agreement to be employed for verifying the one or more entries relating to the one or more resources associated with the one or more transactions. Additionally, the resolution arrangement may further employ voting, proof-of-stake, proof-of-elapsed time or any other consensus mechanism that is suitable for performing conflict resolution.

Optionally, the resolution arrangement may choose individual chains that have the most transactions associated therewith. At an instance when there is a very low probability of two transactions affecting a specific the same one or more transaction, choosing individual chains that have most transactions associated therewith may be a preferred solution to resolve conflicting validations.

More optionally, the resolution arrangement is operable to function across a plurality of chains. The resolution arrangement may perform conflict resolution by validating a new entry when the conflict arises between two or more records maintained in the plurality of chains. The resolution arrangement may analyse consensus for verifying the one or more entries relating to the one or more resources associated with the one or more transactions, having an association with the plurality of chains.

As mentioned previously, the resource management system records the at least one new entry when verified to its corresponding given chain. Furthermore, the one or more records associated with the at least one new entry may be maintained in the given chain. Additionally, the one or more records associated with the at least one new entry may be updated.

Furthermore, recording the at least one new entry in its corresponding given chain indicates success of the one or more transactions associated therewith.

Optionally, the at least one new entry concerns a plurality of new entries to be recorded simultaneously, wherein the resource management system is operable to process the plurality of new entries in parallel. Furthermore, the at least one new entry may use the one or more records maintained in one or more chains. Consequently, recording the at least one new entry may require recording the plurality of new entries to be recorded simultaneously in one or more chains. Beneficially, such recording of the plurality of new entries may enable the resource management system to maintain the one or more records in the chains in a non-redundant and updated state.

Optionally, Transient Tokens are representative of at least one of: computer central processing unit (CPU) cycles executable within the system, energy dissipation within the system, access time taken by data processing resources of the system during execution of transactions of Persistent Tokens, access to data memory of the system for storing and/or retrieving data.

Optionally, the Transient Tokens are representative of CPU cycles executable within the system, wherein the CPU cycles are a measure of a representative physical quantity. More optionally, the representative quantity of CPU cycles executable within the system include a measure of at least one of: access to data storage, memory, access to data communication system bandwidth, data communication channels or ports, data processor energy use, data processor energy dissipation, access time taken by data processing resources during transactions, heat generation, cooling energy applied or any other measure associated with one or more CPU cycles.

Moreover, optionally, the system is configured to use Transient Tokens that have been generated by data mining activities. The Transient Tokens are, for example, awarded by the system for computational effort that has been previously provided by various data processing nodes of the system. Specifically, the Transient Tokens may be created by solving mathematical problems and generating a certain number of Transient Tokens in exchange. Mining of the Transient Tokens may be performed by using conventional hardware or may require an advanced hardware and software.

Furthermore, optionally, the system is configured to use Transient Tokens that have been generated by executing smart contracts within the system. The smart contracts may require, for example, more Transient Tokens than a number of Transient Tokens that are available for executing the one or more transactions. Consequently, Transient Tokens required for performing the one or more transactions may be created by executing the smart contracts. Moreover optionally, the Transient Tokens generated for use in a given transaction may be destroyed as soon as the given transaction is completed. In other words, by arranging for the system to use Transient Tokens that are a measure representative of CPU cycles, or a measure of effort required in the system for performing computational tasks, the subset of the one or more data processing nodes of the system are incentivised when implementing one or more transactions to execute and validate them in a most computationally efficient manner. Therefore, employing the Transient Tokens for executing the one or more transactions in the system results in computing hardware of the system being used in most efficient manner (avoiding inconsequential computing activity that merely wastefully dissipates energy within the system), thereby reducing waste of energy and expensive computing hardware.

Optionally, the Transient Tokens are representative of a quantity or amount of at least one of: CPU cycles, data processing hardware energy dissipation, access time taken by data processing resources during execution of the one or more transactions. Additionally, the Transient Tokens may represent number of CPU clock cycles required for executing instructions for implementing the one or more transactions.

As an example, the Transient Tokens may also represent energy consumption in executing the one or more transactions. Such energy consumption corresponds to atmospheric carbon dioxide ($CO_2$) emissions if the energy is generated from combusting fossil fuels alleged to cause anthropogenically-forced climate change, or generation of dangerous nuclear waste if the energy is generated from conventional fission nuclear reactors. Reducing such atmospheric emissions or nuclear waste may, directly or indirectly, be a resulting effect associated with the present invention.

Moreover, the Transient Tokens may represent time taken by data processing resources when retrieving records (namely, information, data), for example from a distributed database implemented within the system, and other resources required for executing the one or more transactions. In an example embodiment, the Transient Tokens may also be representative of any one of: data processing resources, energy dissipation, CPU cycles required in mining thereof.

More optionally, the system is configured to use Transient Tokens that have a corresponding cryptocurrency value. A transaction enabling a token may have a corresponding alternate currency value that may be used in exchange thereof as and when required; using financial incentives to improve an efficiency of operation of the system is also beneficial. Furthermore, the corresponding cryptocurrency may allow one or more new data processing nodes to enter the resource management system, such that the system is dynamically reconfiguring itself in real-time concurrently as it is executing the one or more transactions therein. The one or more new data processing nodes may enter the system by exchanging the cryptocurrency with one or more Transient Tokens. At an instance, exchange of Transient Tokens with cryptocurrency may also allow trade outside the system.

Furthermore, the Transient Tokens have a defined lifetime after creation thereof within the system. Optionally, the system employs only one type of the one or more transactions enabling tokens having a defined lifetime and a defined equivalent computing cycles. Alternatively, optionally, the system employs a plurality of different types of Transient Tokens, that are mutually different in respect of their respective lifetimes and/or their defined equivalent computing cycles. Optionally, the lifetime or lifetimes of the Transient Tokens are made temporally variable depending upon a total aggregate computing load experienced by the system and/or as a function of how many data processing nodes are participating in the system at a given time.

In an embodiment, the Transient Tokens are added to a pool of tokens after expiring the defined lifetime thereof. Specifically, the Transient Tokens have a lifetime within which the Transient Tokens are valid for use for executing the one or more transactions within the system. In an example embodiment, the defined lifetime of the Transient Tokens may get reset during transaction thereof. Furthermore, the defined lifetime is optionally decided at a time of creation of the Transient Tokens. Additionally, the defined lifetime of the Transient Tokens is changed as per requirement later in the system, for example in manner as described in the foregoing.

Subsequently, a number of Transient Tokens available for a given transaction within the system are associated with a number of Transient Tokens in the pool of tokens. It will be appreciated that the pool of tokens may not be useable after an expired lifetime thereof. Therefore, number of Transient Tokens in the system decreases by the number of Transient Tokens in the pool of tokens.

Furthermore, optionally, the value of the Transient Tokens depreciates according to at least one depreciation rate. It will be appreciated that the Transient Tokens have a defined lifetime. Subsequently, in an example, value of a number of transient tokens that are about to expire depreciates according to at least one depreciation rate. In such case, an owner of the number of transient tokens that are about to expire may have to bear a loss during exchange of the number of Transient Tokens that are about to expire, owing to decreased value thereof.

A frequency of transactions involving the Transient Tokens is relatively high and a frequency of transactions involving Persistent Tokens is relatively low as compared to the Transient Tokens. Specifically, the defined lifetime of Transient Tokens ensures high frequency of transactions involving the Transient Tokens. In an example embodiment, such a frequency of transactions may be called analogously a 'velocity of transactions', wherein 'velocity' is not employed in a normal kinematic sense. In such an embodiment, the Transient Tokens may have a high frequency of transactions, namely a 'high velocity of transactions', and the Persistent Tokens may have a low frequency, namely a low 'velocity of transactions'.

Optionally, the smart contracts are executed for implementing the one or more transactions within the system. Furthermore, the smart contracts may include instructions for implementing the one or more transactions associated thereto. Additionally, a given smart contract for a given transaction may include a defined number of Persistent Tokens and/or Transient Tokens to be exchanged in the given transaction. Furthermore, the given smart contract also includes a defined number of Transient Tokens required for executing the given transaction.

Furthermore, optionally, a smart contract includes:
(i) a first address field containing a first address of the Transient Tokens accompanying the Persistent Tokens;
(ii) a second address field containing a second address, wherein the second address associates with an address to which unused Transient Tokens related to the first address are to be transferred; and
(iii) a signature field that verifies the transaction; for example, verification can be achieved by using a hash function associated with private-public key encryption.

The smart contract includes information such as number of Transient Tokens required for executing a transaction associated thereto as well as a location (such as, an identification number, an associated account, a memory address or any such identifier that may uniquely identify specific Transient Tokens) of the Transient Tokens defined in the first address field.

Specifically, the Transient Tokens required for executing the one or more transactions may be used for performing network operations and validations performed by miners, for example moving data about within the system from a server of a first node of the system to a server of a second node of the system, for providing data duplication for enhancing data security against data loss within the system. Furthermore, the one or more transactions may use the Transient Tokens for such operations and for paying miners as well for work thereof. Such network operations and validations may be subject to various constraints such as availability of computing resources of the system, waiting time in the system for resources becoming available to implement a transaction, and so forth that may affect number of the Transient Tokens required in executing the one or more transactions. It is to be understood that the smart contracts optionally contain (or otherwise identify) a maximum number of Transient Tokens that may be required for executing the one or more transactions. Consequently, at an instance when a given number of the Transient Tokens actually used in executing a given transaction is less than number of the Transient Tokens available for execution of the given transaction. In such example, remaining (namely, unused) Transient Tokens may be transferred (namely, sent) to an address included in the second address field. Furthermore, the signature field may be used to verify that a transaction issuer owns the Transient Tokens that are being spent.

Optionally, the system performs a verification wherein the one or more data processing nodes of the system are operable to provide at least one of: replication of data or information associated with a given transaction, proof of work performed in respect of a given transaction, proof of stake in a given transaction. Furthermore, verification (namely, validation) of tokens may be performed by replication thereof. Additionally, a successful replication of tokens may authenticate validity of the tokens and an unsuccessful replication may indicate that the tokens may have been tampered or illegitimate. Moreover, the verification by proof of work indicates that the number of Transient Tokens that are issued to a miner would be proportional to a computational power put by the miner into the proof of work. Furthermore, such a proof of stake may authenticate ownership of the Transient Tokens by establishing a stake of an owner in the Transient Tokens and the transactions associated thereto. In an example, such verifications may be carried out by applying zk-SNARK proofs. Additionally, zk-SNARK stands for "Zero-Knowledge Succinct Non-Interactive Argument of Knowledge," and refers to a proof construction where one can prove possession of the tokens without revealing any information associated thereto, and without any interaction between owner of the tokens and verifier. The tokens may be transacted to perform the one or more transactions after verification of validity and ownership thereof.

As mentioned previously, the data processing arrangement transacts or executes the Persistent Tokens as supported by Transient Tokens accompanying the Persistent Tokens, in an anomalous manner. The Transient Tokens are akin to a 'fuel' for an 'engine' that functions to execute the one or more transactions, wherein the one or more transactions affect Persistent Tokens that are representative of real physical resources and processes. It is desirable that the one or more transactions are executed in a manner that is most efficient in respect of consumption of the 'fuel'. Furthermore, the one or more transactions involving the Persistent Tokens must have the Transient Tokens required for network operations in execution thereof. The data processing arrangement is capable of performing operations and executing instructions required for execution of the one or more transactions. Furthermore, the data processing arrangement is also operable to communicate between the one or more data processing nodes in order to access and retrieve information required for executing the one or more transactions within the system.

In an example embodiment, a transaction includes an exchange of Persistent Tokens for Transient Tokens. For example, a user may need Transient Tokens for executing a transaction of Persistent Tokens. The user may trade Persistent Tokens from a miner or any other user having possession of Transient Tokens within the system. In return, the user may obtain or otherwise acquire Transient Tokens required for performing the transaction of Persistent Tokens.

In another embodiment, a transaction includes exchange of Transient Tokens for Persistent Tokens. For example, a user having possession of Transient Tokens may not need to perform any transaction for a long period of time, for example weeks, months, even years. The user may exchange the Transient Tokens (having a defined lifetime or defined lifetimes) thereof for Persistent Tokens from another user or miner within the system. Optionally, the user having ownership of the Transient Tokens may always pay for any additional Transient Tokens required for executing the transactions.

In yet another example embodiment, a transaction includes an exchange of Transient Tokens for other Transient Tokens, for example where the Transient Tokens have mutually different associated defined lifetimes. For example, a user A may lend a certain number of Transient Tokens to another user B. Later, the user B may return the certain number of Transient Tokens to the user A. Optionally, transactions including exchange of the Transient Tokens only may not require the Transient Tokens to execute the transactions.

In an exemplary implementation, the resource management system is associated with are N chains, Q data processing nodes, P clients and M filter arrangements. This allows evaluation of M transactions in parallel, coming from P clients and Q nodes in such a way that N chains are used. The transactions themselves are then communicated to Q nodes. Additionally, N, M, P and Q are all parameters that the one or more data processing nodes may optimize, to achieve highest possible performance. Some parameters, in particular, N may be determined in consensus with other nodes on the network and remaining parameters may be determined by the external conditions that the one or more processing nodes are exposed to. Additionally, the filter arrangement determines, to which chains the one or more transaction belongs to and ensures that the one or more transactions are added to the system in parallel. Additionally, optionally, the filter arrangement and chain layer may have a locking mechanism that locks the one or more resources to avoid conflicting transactions being added at the same point in time. This may result in formation of a number of transaction blocks, one for each chain. Once the transaction blocks have been formed, a proof is then found by either an internal or external module. The block may be submitted to the one or more data processing nodes through the P2P layer, and in some embodiments, it may also be possible to submit blocks through the client layer. It is important to understand that M and N are variable parameters that will change throughout the resource management system's lifetime. The parameter N is typically agreed upon by consensus with the other nodes (Q), where M is a parameter that is selected by the data processing node to accommodate the P clients connecting thereto.

Optionally, the resource management system is resistant to faulty and malicious transactions in the network. The resource management system employs cryptographic techniques such as RSA (Rivest-Shamir-Adleman) public key cryptosystems, ECDSA (Elliptic Curve Digital Signature Algorithm), public-private key cryptography, digital signatures, postquantum signatures (such as lattice based signatures, code based signatures, Merkle signatures and so forth), hash functions such as SHA-256 or SHA-3 and hierarchical hash based schemes such as extendible hashing which treats a hash as a bit string, and uses a trie (namely, a digital tree) for bucket lookup. Furthermore, malicious data process nodes sending invalid (namely, spam) transactions may be identified by resolution arrangement of receiving data processing nodes. Additionally, the receiving data processing nodes may be operable to drop connections with such malicious data processing nodes. Furthermore, optionally, transactions between chains may provide an ordering of transactions with respect to transactions in other chains and increase the difficulty of carrying out double-spending attacks.

In an exemplary implementation of a transaction executed within the system, a user A wants to buy a used mobile phone from another user B using the system. Furthermore, list price of mobile phone may be 12,000 TT, and cost of a smart contract associated with the transaction may be 200 TT. Additionally, lifetime of TT may be maximum 4 hours. Moreover, the user A may have 4,000 TT that may be expiring in 1 hour and 17 TT (namely, low velocity token) in wallet thereof. Additionally, user B may have 3,000 TT that may be expiring in 30 minutes in wallet thereof. During the transaction, user A may agree to buy the mobile phone from the user B for the list price of 12,000 TT. Moreover, user A has 4,000 TT in wallet thereof that is insufficient for the transaction. Therefore, the user A may convert 9 VT into 9,000 TT via an exchange arrangement. It is to be understood that, for the purpose of simplicity of the exemplary implementation, there are no charges considered for the exchange of VT and TT. Furthermore, the smart contract may be configured, written and subsequently executed. Additionally, execution of the smart contract (that is 200 TT) may be paid by user A. Subsequently, 200 TT are credited to a miner's wallet that has executed the smart contract associated with the transaction. After execution of the transaction, user A may have 800 TT (expiring in 1 hour) and 6 VT in wallet thereof. Additionally, user B may have 15,000 TT in wallet thereof, wherein 3,000 TT (that were already owned by the user B) have expiration time of 30 minutes and 12,000 TT (that were exchanged during the transaction) have expiration time 4 hours. It is to be understood that lifetime of TT invoked before reaching expiration time thereof get restored.

The present description also relates to the method as described above. The various embodiments and variants disclosed above apply mutatis mutandis to the method.

Optionally, the method includes configuring a data processing arrangement to process tokens that are transacted vis the data communication network, characterised in that the method includes:

(i) arranging for at least a first portion of the tokens to be Persistent Tokens that are representative of one or more values of one or more resources, wherein the Persistent Tokens are transacted within the system, and at least a second portion of the tokens are Transient Tokens that represent one or more data processing resources of the data processing arrangement used for processing one or more transactions of the Persistent Tokens, wherein the Transient Tokens have a defined lifetime after creation thereof within the system; and (ii) transacting or executing using the data processing arrangement the Persistent Tokens as supported by consuming Transient Tokens accompanying the Persistent Tokens;

wherein the Transient Tokens are representative of at least one of: CPU cycles executable within the system, energy dissipation within the system, access time taken by data processing resources of the system during execution of transactions of Persistent Tokens, access to data memory of the system for storing and/or retrieving data.

Optionally, the method includes configuring the filter arrangement to pre-select the subset of the one or more data processing nodes depending upon at least one of:

(i) information relating to a plurality of earlier entries recorded in the given chain to which the at least new entry to be verified is to be recorded;

(ii) a group of resources that are mutually related for which the at least one new entry to be verified;

(iii) a group of transactions that are mutually related for which the at least one new entry to be verified;

(iv) information relating to parties associated with one or more transactions associated with the at least one new entry to be verified;

(v) a group of chains that are mutually related, and that are related to the at least one new entry to be verified;

(vi) a manner in which one or more chains have been previously split into one or more daughter chains onto which the at least one new entry is to be recorded;

(vii) information relating to proof-of-work, proof-of-stake, election of the at least new entry to be verified relating to one or more resources associated with the at least one new entry to be verified;

(viii) management of responsibility across the one or more data processing nodes when data is distributed across one or more chains associated with the at least one new entry to be verified; and (ix) a grouping of resources that are frequently traded with one and another.

Optionally, the method includes using a resolution arrangement of the resource management system for resolving conflicting validations for the at least one new entry to be recorded against one or more chains.

Optionally, the method includes controlling the resolution arrangement based upon a consensus from a plurality of proofs provided in response to a conflicting validation arising within the resource management system.

Optionally, the method includes using the resource management system to process the at least one new entry when concerning a plurality of new entries to be recorded simultaneously, wherein the resource management system is operable to process the plurality of new entries in parallel.

Optionally, representative quantity of CPU cycles include a measure of at least one of: access to data storage, memory, access to data communication system bandwidth, data communication channels or ports, data processor energy use, data processor energy dissipation, access time taken by data processing resources during transactions, heat generation, cooling energy applied or any other measure associated with one or more CPU cycles.

Optionally, the method includes using Transient Tokens generated by executing smart contracts within the system.

Optionally, the method includes using Transient Tokens generated by data mining activities.

Optionally, the method includes using Transient Tokens generated by execution of smart contracts.

Optionally, the smart contracts include one address field containing a first address of the Transient Tokens accompanying the Persistent Tokens, another address field containing a second address, wherein the second address associates with an address to which unused Transient Tokens related to the first address are to be transferred and a signature field that verifies the transaction.

Optionally, the verification is performed by providing at least one of: replication, proof of work, proof of stake.

Optionally, the method includes depreciating the value of the Transient Tokens according to at least one depreciation rate.

Optionally, the method includes adding the Transient Tokens to a pool of tokens after expiring the defined lifetime thereof.

Optionally, the method includes associating the number of Transient Tokens available for transaction with the number of Transient Tokens in the pool of tokens.

DETAILED DESCRIPTION OF THE DRAWINGS

Referring to FIG. 1, illustrated is a schematic diagram of a resource management system 100 configured to maintain one or more records relating to one or more transactions associated with one or more resources, in accordance with an embodiment of the present disclosure. The system 100 comprises one or more data processing nodes such as 102, 104, 106 and 108 and a data communication network 110. Specifically, the one or more data processing nodes 102, 104, 106 and 108 are mutually coupled via the data communication network 110. Furthermore, the data communication network 110 comprises one or more chains of one or more resources shown by horizontal bars such as horizontal bars 1. Furthermore, the one or more records relating to one or more transactions shown by vertical bars such as vertical bars 2 are maintained in one or more corresponding chains such as chains 1. Additionally, the resource management system 100 is implemented as a distributed ledger arrangement.

It may be understood by a person skilled in the art that the FIG. 1 includes a simplified illustration of the resource management system 100 for sake of clarity only, which should not unduly limit the scope of the claims herein. The person skilled in the art will recognize many variations, alternatives, and modifications of embodiments of the present disclosure.

Figure 2:
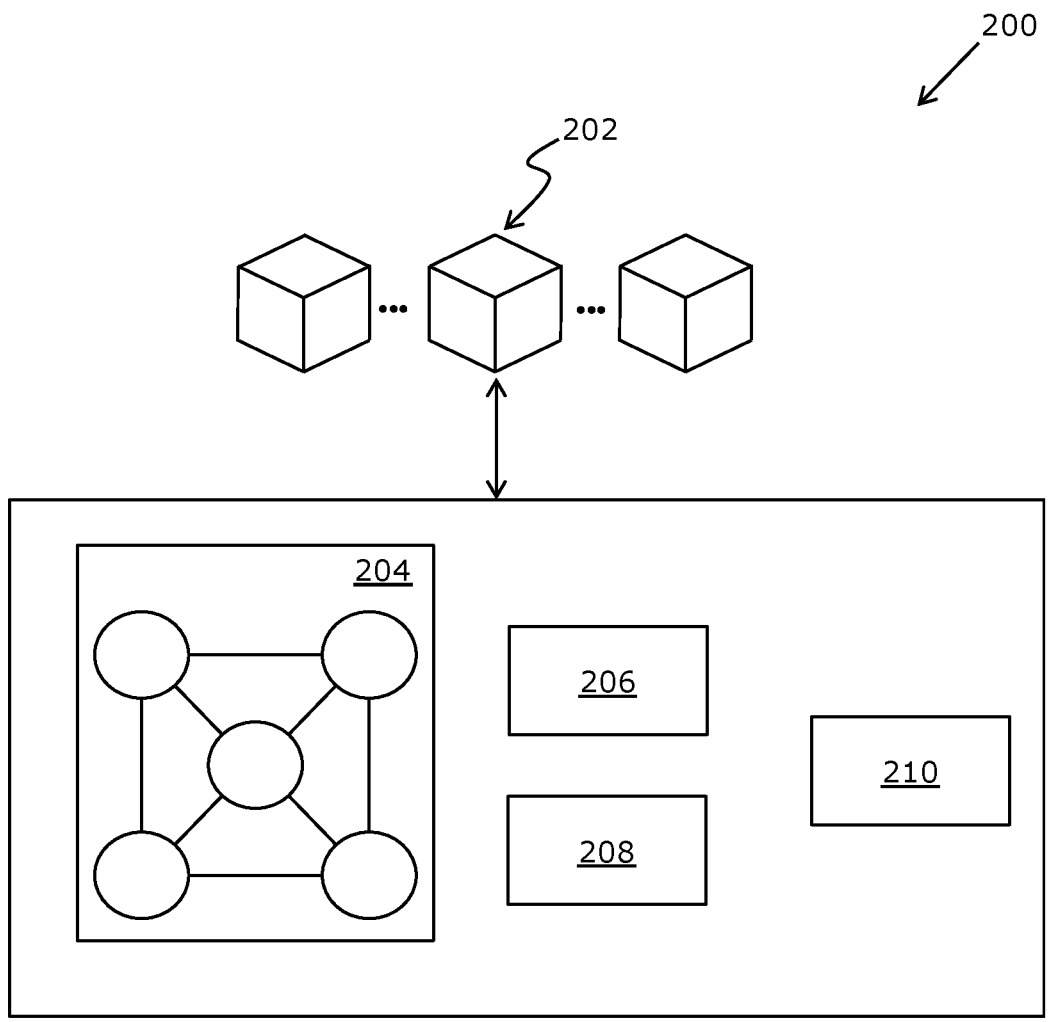
FIG. 2 is a schematic illustration of a resource management system, in accordance with an exemplary implementation of the present disclosure.

Referring to FIG. 2, illustrated is a schematic illustration of a resource management system 200, in accordance with an exemplary implementation of the present disclosure. The resource management system 200 is implemented using a distributed ledger arrangement 202 including one or more data processing nodes 204. Furthermore, the resource management system 200 includes a filter arrangement 206 for limiting communication regarding at least one new entry to be made only to a subset of the one or more data processing nodes of the resource management system for verifying the at least one new entry. The resource management system 200 further includes a data processing arrangement 208 is configured to process token that are transacted via the data communication network (such as the data communication network 110 of FIG. 1). Additionally, the resource management system 200 includes a resolution arrangement 210 for resolving conflicting validations for the at least one new entry to be recorded against one or more chains.

Figure 3:
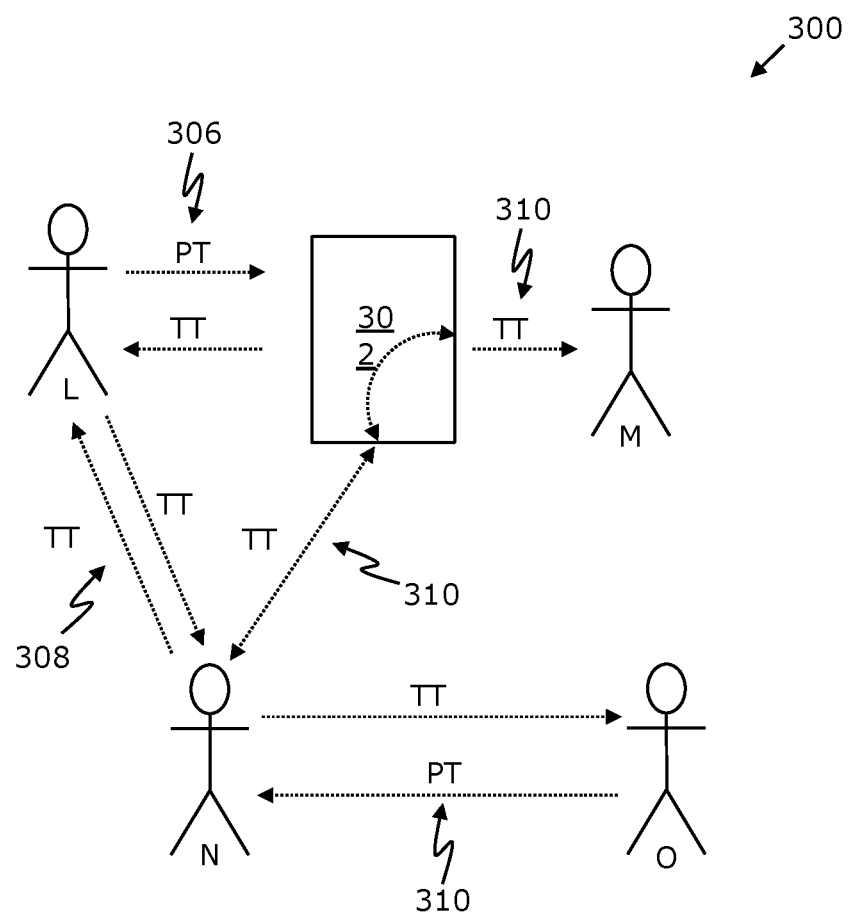
FIG. 3 is a schematic illustration of an exemplary implementation of transactions of tokens within the resource management system, in accordance with an exemplary embodiment of the present disclosure.

Referring to FIG. 3, there is shown a schematic illustration of an exemplary implementation 300 of transactions of tokens within the resource management system, in accordance with an exemplary embodiment of the present disclosure. As shown, the system includes a data processing node 302 associated with a miner M. The data processing node 302 is operable to validate a transaction and perform authentication of terms and instructions mentioned in a smart contract associated with the transaction. The miner M is rewarded with one or more Transient Tokens as a reward for executing various computing tasks, wherein the one or more Transient Tokens are usable within the system 100 for implementing one or more transactions that affect one or more Persistent Tokens. At a given first time, a user L performs a transaction 306 with the miner M via the data processing node 302. The user L provides Persistent Tokens and receives Transient Tokens in return from the miner M. At a given second time, after the first given time, the user L performs a transaction 308 with another user N. In the transaction 308, the user L lends Transient Tokens to the user N, and the user N returns the Transient Tokens later to the user L. At a third time, after the second time, the user N performs a transaction 310 with another user O. The user N gives Transient Tokens to the user O and receives Persistent Tokens in return. Additionally, a smart contract associated with the transaction 310 is executed by the miner M using the data processing node 302. The user N pays Transient Tokens to the miner M via the node 302 for validating terms and executing the smart contract associated with the transaction 310.

It will be appreciated that aforementioned tokens can be moved around as data packets within the system 100. Alternatively, or additionally, the tokens are stored in data memory, for example in one or more user accounts providing data storage and data access. Optionally, the user accounts are stored in a distributed database that spans the system 100 and is accessible to one or more data processing nodes of the system 100. Optionally, the one or more data processing nodes of the system 100 have to be verified or otherwise authorized before they are able to access any data associated with a user account. Such verification is implemented based upon permission given by the users, and/or by a management arrangement of the system 100, subject to certain verification conditions being satisfied, for example that the one or more data processing nodes are trustworthy. Trustworthiness is determined by way of the system 100 performs tests on the one or more data processing nodes and/or on previous reliable conduct of the data processing nodes when implementing one or more transactions within the system 100. Optionally, consensus voting or other data processing nodes or users of the system 100 are employed to determine a degree of trustworthiness of a given node.

Figure 4:
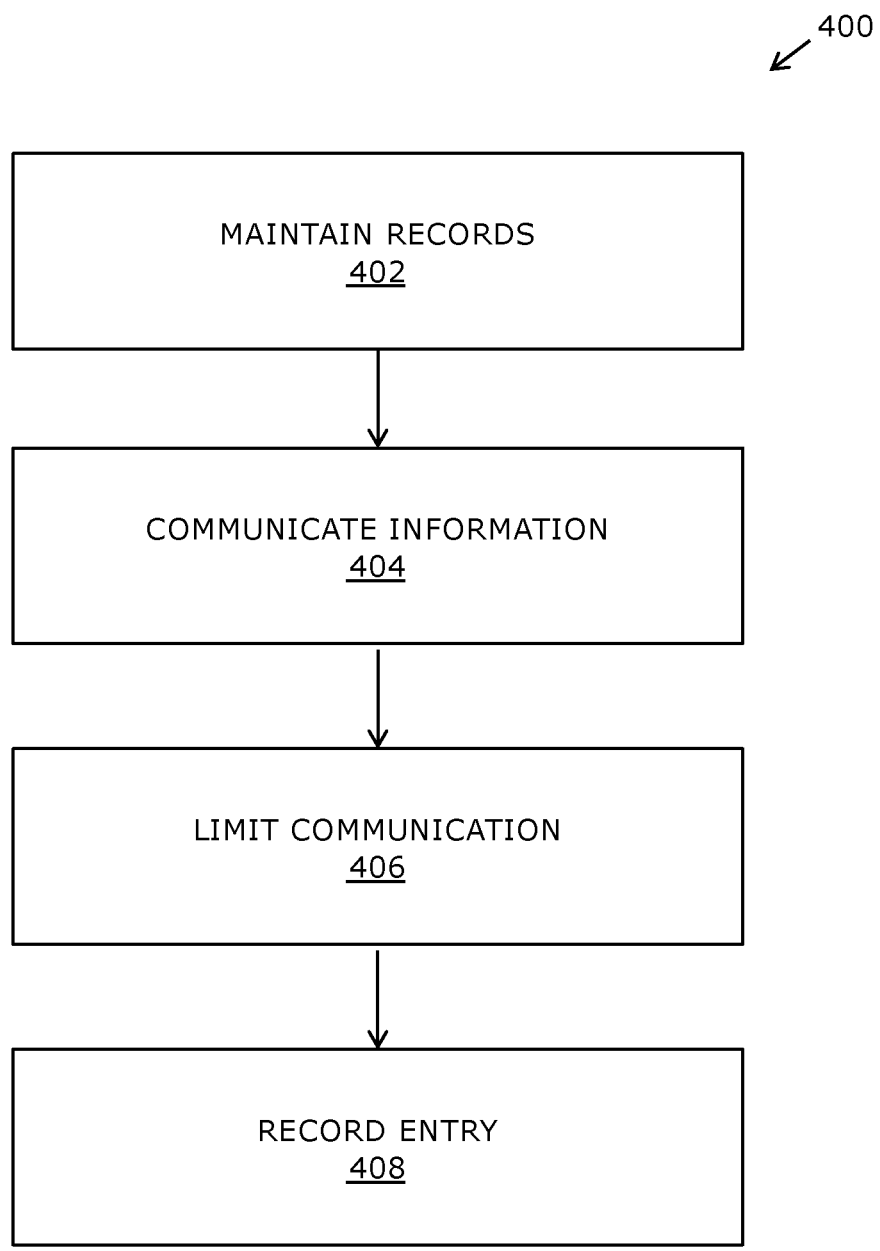
FIG. 4 is an illustration of steps of method of operating a resource management system that is configured to maintain one or more records relating to one or more transactions associated with one or more resources, in accordance with an embodiment of the present disclosure.

Referring to FIG. 4, there is shown an illustration of steps of method 400 of operating a resource management system that is configured to maintain one or more records relating to one or more transactions associated with one or more resources, in accordance with an embodiment of the present disclosure. The resource management system is implemented as a distributed data processing system including one or more data processing nodes that are mutually coupled via a data communication network. At step 402, the one or more records are maintained in one or more corresponding chains. Notably, each chain includes a temporally defined sequence of verified entries, wherein each entry defines one or more corresponding transactions relating to one or more corresponding resources. Furthermore, when at least one new entry is to be made to a given chain. At a step 404, information concerning the at least one new entry is communicated to the one or more data processing nodes of the resource management system for verifying whether or not the at least one new entry is valid for recording to the given chain. At step 406, using a filter arrangement, communication regarding the at least one new entry to be made is limited only to a subset of the one or more data processing nodes for verifying the at least one new entry. At step 408, the at least one new entry is recorded to its corresponding given chain when verified using the resource management system.

The steps 402, 404, 406, and 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A resource management system that is configured to maintain records relating to transactions associated with resources, wherein the resource management system is implemented as a distributed ledger arrangement including data processing nodes that are mutually coupled via a data communication network, wherein:
   (i) the records are maintained in corresponding chains, wherein each chain includes a temporally defined sequence of verified entries, wherein each entry defines one or more corresponding transactions relating to one or more resources, wherein the one or more resources are grouped into chains and wherein, within each of the chains, the one or more resources are defined in sequences based on a time of transaction, and wherein the temporally defined sequence is also defined based on a time of transaction, wherein the one or more corresponding transactions are parallel transactions, wherein the resource management system is configured to split each chain into two or more further chains in order to scale the resource management system to accommodate one or more additional transactions and to increases a transaction capacity of the resource management system;
   (ii) when at least one new entry is to be made to a given chain, information concerning the at least one new entry is communicated to the one or more data processing nodes of the resource management system for verifying whether or not the at least one new entry is valid for recording to the given chain;
   (iii) the resource management system includes a filter arrangement for limiting communication regarding the at least one new entry such that the communication regarding at least one new entry is to be made only to a subset of the one or more data processing nodes, wherein the filter arrangement is operable to identify the subset of one or more data processing nodes from the one or more data processing nodes included in the distributed ledger arrangement that are capable of identifying and authenticating one or more resources associated with the one or more additional transactions, wherein the filter arrangement is configured to pre-select the subset of the one or more data processing nodes of the resource management system for balancing data processing and/or data communication load associated with the one or more chains within the resource management system, wherein the one or more data processing nodes that are pre-selected to verify entry of the earlier one or more transactions of the parties associated with one or more transactions associated with the at least one new entry to be validated, are configured to verify the at least one new entry to the given chain by communicating to chains having relevance and a direct or indirect association with the new entry to reduce an amount of computing effort and data communication occurring within the resource management system required for processing the at least one new entry;
   (iv) the resource management system is configured to record the at least one new entry when verified, to determine a validity of the transactions to its corresponding given chain.

2. A resource management system of claim 1, wherein the pre-selection of the subset of the one or more data processing nodes depending upon at least one of:
   (i) information relating to a plurality of earlier entries recorded in the given chain to which the at least new entry to be verified is to be recorded;
   (ii) a group of resources that are mutually related for which the at least one new entry to be verified;
   (iii) a group of transactions that are mutually related for which the at least one new entry to be validated;
   (iv) information relating to parties associated with one or more transactions associated with the at least one new entry to be verified;
   (v) a group of chains that are mutually related, and that are related to the at least one new entry to be verified;
   (vi) a manner in which one or more chains have been previously split into one or more daughter chains onto which the at least one new entry is to be recorded;
   (vii) information relating to proof-of-work, proof-of-stake, election of the at least new entry to be verified relating to one or more resources associated with the at least one new entry to be verified;
   (viii) management of responsibility across the one or more data processing nodes when data is distributed across one or more chains associated with the at least one new entry to be verified; and
   (ix) a grouping of resources that are frequently traded with one and another.

3. A resource management system of claim 2, wherein the resource management system includes a resolution arrangement for resolving conflicting validations for the at least one new entry to be recorded against one or more chains, wherein the resolution arrangement is controlled based upon a consensus from a plurality of proofs provided in response to conflicting validations arising within the resource management system.

4. A resource management system of claim 3, wherein the at least one new entry concerns a plurality of new entries, wherein the resource management system is operable to verify the plurality of new entries simultaneously when more than one subset of data processing nodes are pre-selected.

5. A resource management system of claim 1, wherein the verification is performed by providing at least one of: replication, proof of work, proof of stake.

6. A method of operating a resource management system that is configured to maintain records relating to transactions associated with one or more resources, wherein the resource management system is implemented as a distributed ledger arrangement including data processing nodes that are mutually coupled via a data communication network, wherein the method includes:
  (i) maintaining the records in corresponding chains, wherein each chain includes a temporally defined sequence of verified entries, wherein each entry defines one or more corresponding transactions relating to one or more resources,
  wherein the one or more resources are grouped into chains and wherein, within each of the chains, the one or more resources are defined in sequences based on a time of transaction, and wherein the temporally defined sequence is also defined based on a time of transaction, wherein the one or more corresponding transactions are parallel transactions,
  wherein the resource management system is configured to split each chain into two or more further chains in order to scale the resource management system to accommodate one or more additional transactions and to increases a transaction capacity of the resource management system;
  (ii) when at least one new entry is to be made to a given chain, communicating information concerning the at least one new entry to the one or more data processing nodes of the resource management system for verifying whether or not the at least one new entry is valid for recording to the given chain;
  (iii) using a filter arrangement of the resource management system for limiting communication regarding the at least one new entry such that the communication regarding at least one new entry is to be made only to a subset of the one or more data processing nodes,
  wherein the filter arrangement is operable to identify the subset of one or more data processing nodes from the one or more data processing nodes included in the distributed ledger arrangement that are capable of identifying and authenticating one or more resources associated with the one or more additional transactions,
  wherein the filter arrangement pre-selects the subset of the one or more data processing nodes of the resource management system for balancing data processing and/or data communication load associated with the one or more chains within the resource management system, wherein the one or more data processing nodes that are pre-selected to verify entry of the earlier one or more transactions of the parties associated with one or more transactions associated with the at least one new entry to be validated, are configured to verify the at least one new entry to the given chain by communicating to chains having relevance and a direct or indirect association with the new entry to reduce an amount of computing effort and data communication occurring within the resource management system required for processing the at least one new entry;
  (iv) using the resource management system to record the at least one new entry when verified, to determine a validity of the transactions to its corresponding given chain.

7. A method of claim 6, wherein the pre-selection of the subset of the one or more data processing nodes depending upon at least one of:
  (i) information relating to a plurality of earlier entries recorded in the given chain to which the at least new entry to be verified is to be recorded;
  (ii) a group of resources that are mutually related for which the at least one new entry to be verified;
  (iii) a group of transactions that are mutually related for which the at least one new entry to be verified;
  (iv) information relating to parties associated with one or more transactions associated with the at least one new entry to be verified;
  (v) a group of chains that are mutually related, and that are related to the at least one new entry to be verified;
  (vi) a manner in which one or more chains have been previously split into one or more daughter chains onto which the at least one new entry is to be recorded;
  (vii) information relating to proof-of-work, proof-of-stake, election of the at least new entry to be verified relating to one or more resources associated with the at least one new entry to be verified;
  (viii) management of responsibility across the one or more data processing nodes when data is distributed across one or more chains associated with the at least one new entry to be verified; and
  (ix) a grouping of resources that are frequently traded with one and another.

8. A method of claim 7, wherein the method includes using the resource management system to process the at least one new entry when concerning a plurality of new entries to be recorded simultaneously, wherein the resource management system is operable to process the plurality of new entries in parallel.

9. A method of claim 6, wherein the verification is performed by providing at least one of: replication, proof of work, proof of stake.

* * * * *